United States Patent Office 3,126,272
Patented Mar. 24, 1964

3,126,272
METHOD FOR CONTROLLING PLANT GROWTH
Adolf Fischer, Mutterstadt, Pfalz, Horst Pommer and Guenter Scheuerer, Ludwigshafen (Rhine), and Herbert Stummeyer, Mannheim, Germany, assignors to Badische Anilin- & Soda-Fabrik Aktiengesellschaft, Ludwigshafen (Rhine), Germany
No Drawing. Filed Mar. 16, 1961, Ser. No. 96,088
Claims priority, application Germany Mar. 25, 1960
1 Claim. (Cl. 71—2.7)

It is known that substituted area derivatives of the general formula:

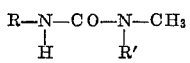

in which R denotes an alkyl radical with 2 to 6 carbon atoms and R' denotes an alkyl radical with 1 to 4 carbon atoms or hydrogen have herbicidal activity.

It is an object of the present invention to provide compounds having good selectivity as herbicides.

A further object of the invention is to provide compounds which can be used for controlling weeds growing on the same area as carrots and sugar beets without damage to the crop plants. These and other objects and advantages of the invention are achieved by compounds of the formula:

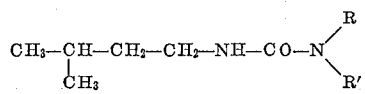

in which R and R' each denotes hydrogen or an alkyl or alkenyl group with 1 to 4 carbon atoms and R and R' may also be part of a heterocyclic ring.

The superior herbicidal activity of the new substituted 3'-methylbutyl (or isoamyl) ureas as compared with known ureas may be seen from the following table in which the second column gives the average herbicidal activity.

| Active substance: | Percent |
|---|---|
| 1-n-butyl-3,3-dimethylurea | 75 |
| 1,1'-methyl-propyl-3,3-dimethylurea | 25 |
| 1,2'-methyl-propyl-3,3-dimethylurea | 30 |
| 1-trimethyl-methyl-3,3-dimethylurea | 15 |
| 1-n-amyl-3,3-dimethylurea | 25 |
| 1,3'-methyl-butyl-(or isoamyl)-3,3-dimethylurea | 100 |

The compounds to be used according to this invention can be prepared by known methods. Thus, 1-isoamylureas (Formula II) substituted at the 3-position are obtained by reacting isoamyl isocyanate (Formula I) with primary or secondary amines, such as methylamine, ethylamine, butylamine, allylamine, dimethylamine, diethylamine or methylbutylamine, pyrrolidine, piperidine or morpholine in an inert solvent, such as benzene, toluene, xylene, dioxane, cyclohexane, phenol ethers or ethal acetate at temperatures between 0° and 100° C. in accordance with the following scheme:

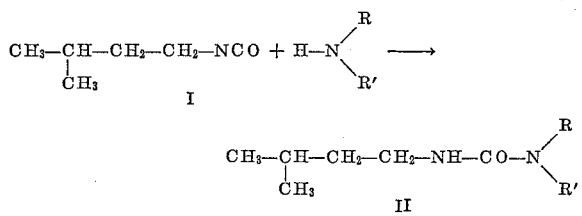

in which R and R' have the meanings given above.

When using toluene as the solvent, the product can be worked up by washing the toluene solution, after the reaction has been completed, with dilute mineral acid and purifying the urea by distillation after having distilled off the solvent.

The procedure may however also be that carbamyl chlorides of the general Formula III are reacted with isoamylamine:

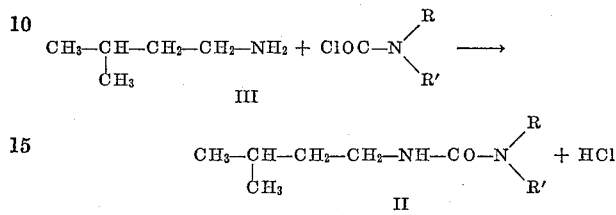

R and R' having the meanings given above.

When using an acid acceptor, for example pyridine, trialkylamine, dialkylaniline or quinoline, the reaction is carried out in the solvents and at the temperatures specified above. An excess of isoamylamine can also be used as the acid acceptor.

The new 1-isoamylureas substituted at the 3-position are high boiling substances, usually with a low melting point.

The production of these ureas is described in greater detail in the following examples. The parts specified in the examples are parts by weight.

Example 1

A mixture of 52 parts of 3-methylbutyl-(or isoamyl)-amine and 78.5 parts of triethylamine is dripped into a solution of 77.5 parts of dimethylcarbamyl chloride in 200 parts of toluene in such a way that the temperature does not rise above 60° C. After all has been added, the whole is stirred for 8 hours at 60° C., the cooled toluene solution of the urea is washed with water and dilute hydrochloric acid and dried with sodium sulfate. After distilling off the solvent, the residue is fractionated in vacuo. 85 parts of 1,3'-methyl-butyl-3,3-dimethylurea which boils at 110° C./0.2 mm. Hg and melts at 46° C. are obtained.

Example 2

42 parts of diethylamine are dripped at room temperature into a solution of 56 parts of isoamyl isocyanate in 200 parts of toluene and the whole in then stirred for 4 hours at 60° C. The product is worked up as described in Example 1. 82 parts of 1,3'-methyl-butyl-3,3-diethylurea which boils at 110° C./0.2 mm. Hg and has a refractive index of $n_D^{25} = 1.4589$ are obtained.

In the same way:

90 parts of 1,3'-methyl-butyl-3,3-pentamethyleneurea which boils at 133° C./0.2 mm. Hg and melts at 53° C. are obtained from 56 parts of isoamyl isocyanate and 40 parts of piperidine.

75 parts of 1,3'-methyl-butyl-3-allylurea which boils at 154° C./0.4 mm. Hg and melts at 42° C. are obtained from 56 parts of isoamyl isocyanate and 34 parts of allylamine.

71 parts of 1,3'-methyl-butyl-3-ethylurea which boils at 141° C. at 0.2 mm. Hg and melts at 32° C. are obtained from 56 parts of isoamyl isocyanate by introduction of gaseous ethylamine until saturation is reached.

The new compounds are distinguished by high herbicidal activity and good selective herbicidal effect on weeds growing together with carrots and sugar beets, the weeds being destroyed without damage to the crop plants.

In order to control the weeds, the active substances are used in phytotoxic quantities, i.e., a quantity sufficient to achieve the desired effect. This quantity depends on quite a number of factors, for example climate, condition of the weeds and crop plants, condition of the soil, season, etc. In many cases, amounts between 1 and 20 kg. of active substance per hectare may be considered phytotoxic quantities.

The substances may be used in the form of aqueous emulsions. For the preparation of the emulsions there may be used surface-active substances of anionic, cationic or electrically neutral type. Suitable substances of this type include sodium alkylnaphthalene sulfonates, sodium lignin sulfonates, sodium lauryl sulfate, glycerin monostearate, polyethylene oxides or quaternary ammonium salts. Incorporation of organic solvents, such as methanol, isopropanol, isobutanol, xylene, toluene, cresol or cyclohexanone, is often advantageous. The use of the said herbicidal compounds is however not limited to this form. When the active substance is to be used as a dusting agent or strewing agent, it may be mixed with inert solid substances, as for example talc, bentonite, pyrophyllite, diatomaceous earth or silica gel, or with fertilizers, preferably calcium nitrate.

The following examples illustrate the use of the new substances according to this invention.

*Example 3*

Soil is treated with the following urea derivatives:
(a) 1,3'-methyl-butyl-3,3-dimethylurea
(b) 1-n-amyl-3,3-dimethylurea
(c) 1-2'-methyl-propyl-3,3-dimethylurea
(d) 1-n-butyl-3,3-dimethylurea
(e) 1-1'-methyl-propyl-3,3-dimethylurea and
(f) 1-trimethyl-methyl-3,3-dimethylurea in amounts of active substance of 1, 2.5, 5 and 10 kilograms per hectare. The active substances are sprayed on the soil as aqueous dispersions which have been prepared by using sodium lignin sulphonate as dispersing agent. Seedlings develop from seeds of *Sinapis alba* (mustard) and *Avena fatua* (weld oats) which have been sown in the soil thus prepared, but these are later damaged in varying degrees depending on the effect of the individual substances. The results are shown in the following table. The figures giving the degree of damage are based on the following arbitrary scale: 0=no damage, 5=total loss.

| Active substance | Amount of the active substance used in kilograms per hectare— | | | | | | | |
|---|---|---|---|---|---|---|---|---|
| | 1 | 2.5 | 5 | 10 | 1 | 2.5 | 5 | 10 |
| | Wild oats | | | | Mustard | | | |
| (a) | 2–3 | 3–4 | 4–5 | 5 | 5 | 5 | 5 | 5 |
| (b) | 1–2 | 2–3 | 3 | 3–4 | 1 | 2 | 4–5 | 5 |
| (c) | 0 | 1 | 1–2 | 2 | 0 | 1 | 1 | 2–3 |
| (d) | 1 | 2–3 | 3 | 3–4 | 2 | 4 | 4–5 | 5 |
| (e) | 0 | 0 | 1 | 1 | 0 | 0 | 1 | 3–4 |
| (f) | 0–1 | 1 | 1–2 | 2 | 0 | 0 | 0 | 0–1 |

*Example 4*

Sandy clay soil infested with weeds is charged into an earthenware dish 25 x 30 cm. and seeds of *Secale cereale* (rye), *Beta vulgaris saccharitea* (sugar beet), *Fagopyrum esculentum* (buckwheat), *Daucus carota* (carrots), *Allium cepa* (onion) and *Sinapis alba* (mustard) are sown in transverse rows in the uppermost layer. After 4 weeks 1-3'-methyl-butyl-3,3-dimethylurea is sprayed on the plants which have emerged, in an amount equivalent to 1.5 kilograms per hectare dispersed in 1000 liters of water. After another 3 weeks most of the plants, except sugar beets, carrots and onions, have almost completely withered. Of the weeds which have emerged in the soil, the following are destroyed:

*Chenopodium album* (white goosefoot), *Galinsoga parviflora* (French weed), *Stellaria media* (chickweed) and *Lolium perenne* (English rye grass).

What we claim is:

A method for controlling plant growth comprising contacting the plant with a phytotoxic amount of 1,3'-methyl-butyl-3,3-dimethylurea.

References Cited in the file of this patent
UNITED STATES PATENTS

| | | |
|---|---|---|
| 1,785,730 | Davis | Dec. 23, 1930 |
| 2,733,988 | Searle | Feb. 7, 1956 |
| 2,817,684 | Bortnick | Dec. 24, 1957 |
| 2,838,389 | Yoder | June 10, 1958 |
| 2,845,339 | Blvestone | July 29, 1958 |

UNITED STATES PATENT OFFICE
CERTIFICATE OF CORRECTION

Patent No. 3,126,272                                       March 24, 1964

Adolf Fischer et al.

It is hereby certified that error appears in the above numbered patent requiring correction and that the said Letters Patent should read as corrected below.

Column 1, line 11, for "area" read -- urea --; column 3, line 38, for "(weld oats)" read -- (wild oats) --.

Signed and sealed this 21st day of July 1964.

(SEAL)

Attest:

ESTON G. JOHNSON
Attesting Officer

EDWARD J. BRENNER
Commissioner of Patents